Oct. 30, 1934.  K. E. BURG  1,978,668
METHOD OF DETERMINING GEOLOGICAL STRUCTURE
Filed March 25, 1932
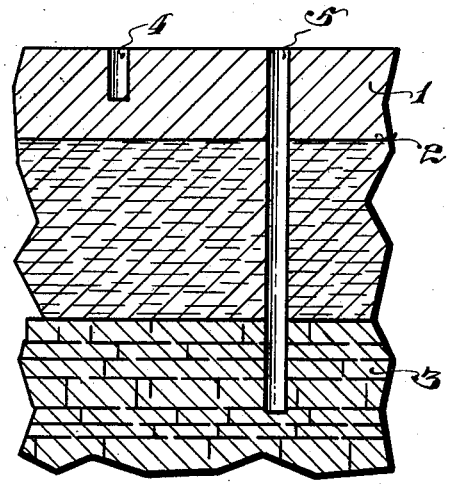
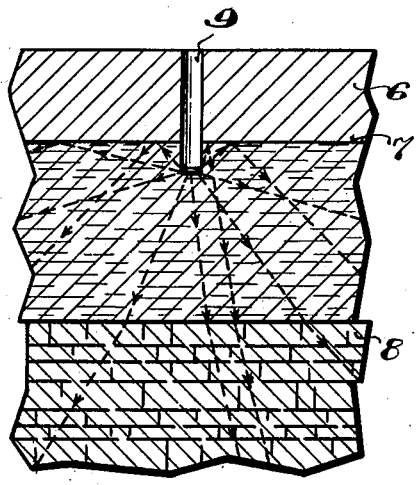
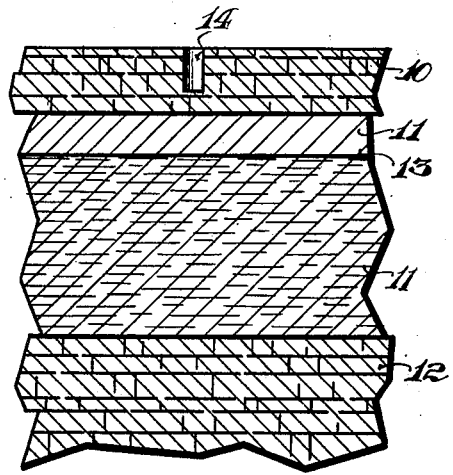
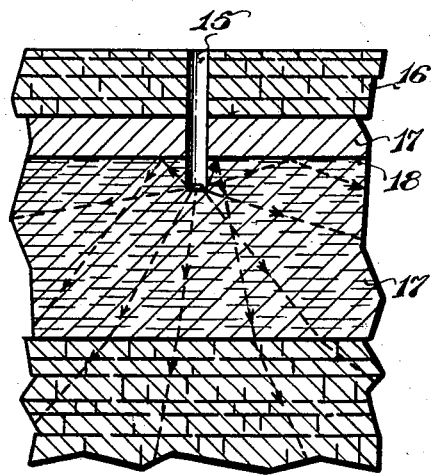
Kenneth E. Burg,
INVENTOR.
ATTORNEYS.

Patented Oct. 30, 1934

1,978,668

UNITED STATES PATENT OFFICE 1,978,668

METHOD OF DETERMINING GEOLOGICAL STRUCTURE

Kenneth E. Burg, Stafford, Kans., assignor to Geophysical Service Inc., a corporation of New Jersey Application March 25, 1932, Serial No. 601,192

2 Claims. (Cl. 181—0.5)

This invention relates to an improved method of generating seismic waves in applied seismology and it has particular reference to certain new and novel steps of obtaining visible records of waves reflected from subsurface formations.

The principal object of the invention is to provide a method of the character specified for securing records of wave transmissions of the type obtained by artificial detonations below the surface of the earth, as by dynamite or like explosives and through the medium of which increased efficiency is made possible and more comprehensive records are obtained.

Another object of the invention is to provide a method including the step of exploding a charge to effect detonation in a water saturated, soft formation which is a desideratum in applied seismology to secure the longitudinal type of wave in that this type of wave simplifies the seismic record and eliminates confusion when the record is deciphered.

The present invention comprehends an approved method over the common and well known method of placing explosives for the purpose of generating seismic waves in which the explosives have either been placed on top of the ground or in holes for the purpose of reducing the amount of surface damage, or for the purpose of increasing the efficiency of the charge. In these latter methods, the explosives have been placed without any particular regard as to the depth or location of the bottom of the hole, except perhaps to conclude that a hole of considerable depth is more desirable than a shallow hole.

With the foregoing objects as paramount, the invention has particular reference to the novel steps of the method and the novel elements of the device through the medium of which the method is successfully carried out and which will become manifest as the description proceeds, taken in connection with the accompanying drawing, wherein:—

Figure 1 shows a condition in which a great thickness of loose earth or unconsolidated material overlies a hard rock formation.

Figure 2 illustrates the application of the present invention under the conditions illustrated in Figure 1.

Figure 3 illustrates another condition of common occurrence wherein is shown a hard rock formation overlying a soft formation of uncemented sand or clay or conglomerate and under which is shown the deeper rock formation and depicting a conventional method, and Figure 4 illustrates the same condition as in Figure 3 except that the charge is placed in accordance with the present invention.

An example of the type of known methods referred to in the foregoing is disclosed in the patent to McCollum, No. 1,724,720. This patent discloses a method in which a hole is drilled through the weathered or unconsolidated earth and into the hard rock formation below. Such a method often entails the drilling of holes to depths of several hundred feet and gives rise to an undesirable multiplicity of seismic waves. Moreover, in large areas, such as central west Texas, where the surface of the ground consists of a cap rock of hard limestone, the McCollum method of drilling into the hard limestone is entirely inadequate as will be subsequently explained.

The present invention defines a method which consists of drilling holes into the earth to a point below the ground water level regardless of the nature of the formations either above or below this level. Once the ground water level is reached, all of the softer rocks will be water saturated so as to give them a propagation velocity for seismic waves equal to or greater than that of water.

By ground water level is meant that depth or point in the ground at and below which the ground is saturated with water from natural sources. This point corresponds to the position in any hole to which water will rise when the hole is drilled below the ground water level and left open. In some localities, the ground water level may be at great depths below the earth's surface. Especially, when this is true, the present invention is more effective than known and similar methods inasmuch as these methods fail to recognize the economical and other advantages of setting off the charge in a water saturated, soft formation into which the water flows from natural sources.

A further advantage of the present invention lies in the fact that the plane of ground water level is an excellent reflecting surface. Consequently, the placing of a charge below this level causes the reflected energy to enhance the downward traveling energy from the charge and therefore increases the effectiveness of the charge.

Furthermore, a water saturated soft earth or rock has a volume co-efficient of compression comparable to that of hard rock formation and accordingly correspondingly high velocity of propagation for longitudinal seismic waves.

Moreover, because of the enhanced compression co-efficient resulting from water saturation, a greater portion of the energy generated by the explosive charge is converted into elastic wave energy and less is dissipated in heat of deformation.

In addition to the foregoing, another obvious advantage lies in the fact that water, being liquid, possesses volume elasticity but no rigidity. Consequently, the water saturated soft formations possess high volume elasticity and very low rigidity with the result that when an explosive charge is detonated in a water saturated soft formation, the explosion generates a strong longitudinal seismic wave and an inappreciable amount of transverse wave energy. This is a very desirable feature because, in applied seismology, it is desirable to have only the longitudinal type of wave present as it simplifies the seismic record and avoids confusion. When a charge is placed in the consolidated rock, as is done by McCollum loc cit, longitudinal and transverse waves of comparable intensity are generated and the resulting seismic records are difficult to decipher.

Referring to the drawing, in Figure 1, the character 1 designates a considerable thickness of loose earth or consolidated material and in which the ground water level is indicated at 2. The material 1 overlies a hard rock formation 3. The common method is to drill a shallow hole 4 or, perhaps a deeper hole 5 which extends well into the hard rock formation 3, sometimes at a depth of several hundred feet. When an explosive charge is placed in the hole 4, a large permanent pocket or crater is formed in the earth with a large resultant dissipation of energy in the form of heat. This is undesirable for several reasons, the most important of which resides in the fact that the pore spaces in the earth above the water table are filled with air; also the earth particles are loosely cemented together due to the mechanical and chemical effects of the surface water as it flows through the pore spaces and finally comes to rest at the ground water level. This does not constitute a very rigid body and consequently when a charge of dynamite is exploded in the earth above the water table an elastic wave of rather small energy content is generated. On the other hand when these pore spaces are filled with water, (which is the condition that exists below the water table), as prescribed by the method herein defined, a more rigid body is presented and an elastic wave of greater energy content is generated and consequently propagated into the earth.

In the case of the deeper hole 5 the cost of drilling the hole is in many cases prohibitive, for instance, in the Gulf Coastal Plain and in California where the seismograph is commonly used for oil field exploration, the depth to earth rock is generally one hundred or more feet and may exceed one thousand feet.

In Figure 2, the application of the present invention is shown in substitution of the method carried out in Figure 1 and in which the unconsolidated formation is designated at 6, the ground water level at 7, overlying the hard rock formation 8. The initial step in carrying out the present method is a hole 9 dug or drilled to a depth of three or more feet below the ground water level 7. The depth to which the hole extends below the ground water level depends upon the size of the explosive charge and may exceed twenty-five feet for larger charges.

Since the plane of the ground water level, because of the abrupt change in velocity of propagation at this surface, is an excellent reflecting surface, a large portion of energy which travels upward from the exploding charge is reflected downward, as shown by the lines in Figure 2 and enhances the intensity of the energy originally directed downward from the charge. A comparatively small pocket is made and there is little loss of energy due to deformation or shattering. Referring to Figure 3, another condition of common occurrence is shown wherein 10 is a hard rock formation overlying a soft formation 11, such as uncemented sand or clay or conglomerate. The deeper rock formation is designated at 12 and the ground water level is shown at 13. If a hole 14 is drilled into the hard rock formation 10, and a charge placed therein, such a multiplicity and complexity of direct, reflected and possibly refracted longitudinal and transverse waves will be generated that a record on an adjacent seismograph will be undecipherable.

The same condition as shown in Figure 3 is illustrated in Figure 4 except that the method herein described is carried out. The hole 15 is directed through the hard rock formation 16 and into the soft formation 17 to a point below the ground water level 18 and a charge is detonated at the bottom of the hole. A seismograph in close proximity to the hole will record only one direct longitudinal wave and only longitudinal reflections. All other disturbances will be of inappreciable amplitudes, primarily because of the fact that a charge placed in the softer formation below the ground water level 18 generates a strong longitudinal wave, yet a transverse wave of negligible amplitude. The charge heretofore referred to may be an explosive charge of dynamite or an equivalent explosive or any mechanical or other device capable of generating elastic waves in earth or water.

While the steps of the herein described method have been defined with great particularity, it will be understood that certain modifications may be resorted to from time to time without departing from the spirit of the invention as set forth in the appended claims.

What is claimed is:

1. That method of generating seismic waves below the ground water level in the earth for the purpose of making sub-surface geological explorations, said method characterized by causing a generator of seismic waves to be placed below the ground water level in the earth and causing said generator to operate in conjunction with seismic recording apparatus, receiving and recording said seismic waves and observing the results secured therefrom.

2. That method of generating seismic waves below the ground water level in the earth for the purpose of making sub-surface geological explorations, said method characterized by causing an explosive charge to be placed below the ground water level in the earth and causing said charge to operate, and in receiving and recording the reflected seismic waves.

KENNETH E. BURG.